(12) United States Patent
Wada et al.

(10) Patent No.: US 8,256,206 B2
(45) Date of Patent: Sep. 4, 2012

(54) EXHAUST EMISSION CONTROL DEVICE AND METHOD FOR INTERNAL COMBUSTION ENGINE, AND ENGINE CONTROL UNIT

(75) Inventors: Katsuji Wada, Saitama (JP); Norio Suzuki, Saitama (JP); Takashi Konomoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 885 days.

(21) Appl. No.: 12/069,784

(22) Filed: Feb. 13, 2008

(65) Prior Publication Data

US 2008/0190097 A1    Aug. 14, 2008

(30) Foreign Application Priority Data

Feb. 13, 2007  (JP) .................................. 2007-032528

(51) Int. Cl.
*F01N 3/00* (2006.01)

(52) U.S. Cl. ................. 60/286; 60/274; 60/276; 60/295; 60/297; 60/303

(58) Field of Classification Search .................... 60/274, 60/276, 285, 286, 295, 297, 303, 301
See application file for complete search history.

(56) References Cited

U.S. PATENT DOCUMENTS

| | | | | |
|---|---|---|---|---|
| 6,233,925 B1 * | 5/2001 | Hirota et al. | ..................... | 60/285 |
| 6,276,130 B1 * | 8/2001 | Ito et al. | ........................... | 60/278 |
| 6,378,297 B1 * | 4/2002 | Ito et al. | ........................... | 60/284 |
| 6,553,757 B1 * | 4/2003 | Surnilla et al. | .................. | 60/285 |

FOREIGN PATENT DOCUMENTS

| | | |
|---|---|---|
| EP | 1077319 A2 | 2/2001 |
| EP | 1394375 A1 | 3/2004 |
| JP | 2001-90591 | 4/2001 |
| JP | 2002-371889 | 12/2002 |
| JP | 2004-232496 | 8/2004 |
| JP | 2006-266213 | 10/2006 |
| JP | 2006-348904 | 12/2006 |
| WO | 2006/027905 A1 | 3/2006 |

OTHER PUBLICATIONS

European Office Action for Application No. 08001841.9-1263, dated Apr. 25, 2008.
Japanese Office Action for Application No. 2007-032528, dated May 31, 2011.

* cited by examiner

*Primary Examiner* — Binh Q Tran
(74) *Attorney, Agent, or Firm* — Nelson Mullins Riley & Scarborough LLP; Anthony A. Laurentano

(57) ABSTRACT

An exhaust emission control device for an internal combustion engine, which is capable of properly regenerating a NOx catalyst, while properly controlling NOx catalyst temperature and ensuring excellent drivability. As a regeneration operation, the exhaust emission control device feedback-controls a detected reducing condition of exhaust gases to a predetermined reducing condition, by controlling the amount of main fuel injected by main injection or feedback-controls the same to the predetermined reducing condition by controlling the amount of auxiliary fuel injected by auxiliary injection. The device determines whether the regeneration operation should be executed in a catalyst temperature control mode for controlling the NOx catalyst temperature. If, as a result of the determination, the regeneration operation should be executed in the catalyst temperature control mode, the device selects the feedback control of the main fuel amount, and otherwise selects the feedback control of the auxiliary fuel amount.

9 Claims, 8 Drawing Sheets

F I G. 9
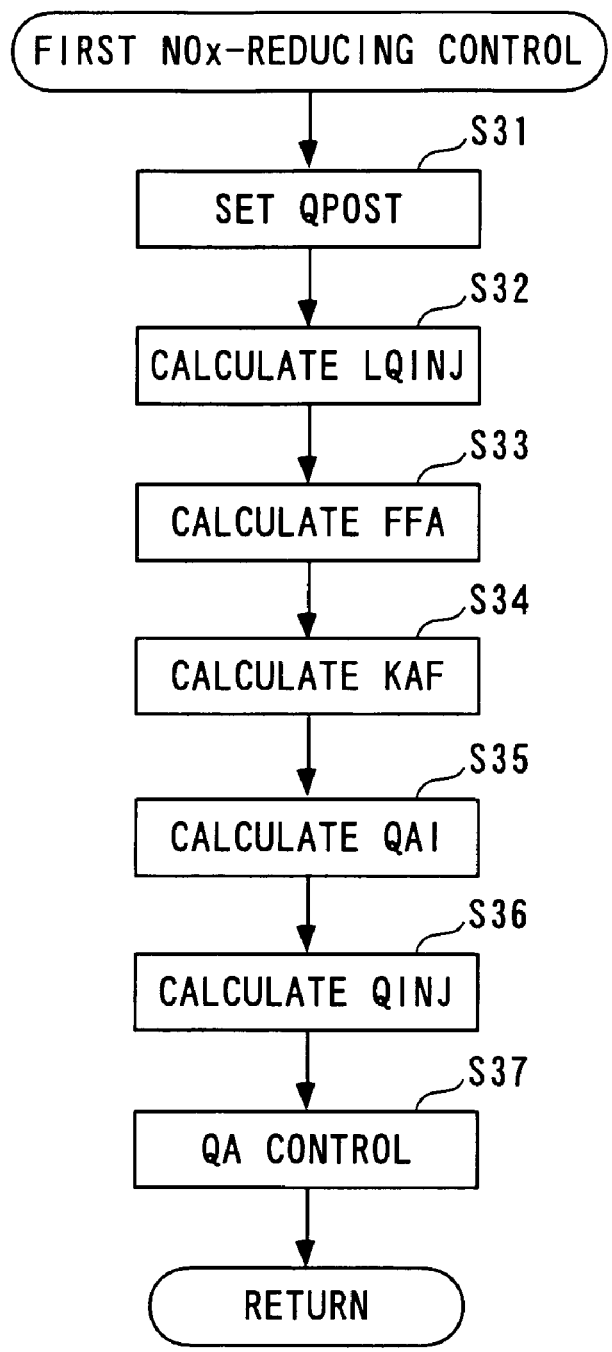

EXHAUST EMISSION CONTROL DEVICE AND METHOD FOR INTERNAL COMBUSTION ENGINE, AND ENGINE CONTROL UNIT

BACKGROUND OF THE INVENTION

1. Field of the Invention

The present invention relates to an exhaust emission control device and method for an internal combustion engine and an engine control unit, and more particularly to an exhaust emission control device including a NOx catalyst that is disposed in the exhaust system of the engine, for trapping NOx in exhaust gases emitted from the engine, an exhaust emission control method, and an engine control unit.

2. Description of the Related Art

Conventionally, there has been proposed an exhaust emission control device of this kind, such as an exhaust emission control device for a diesel engine (hereinafter simply referred to as "the engine"), e.g. in Japanese Laid-Open Patent Publication (Kokai) No. 2002-371889. In this exhaust emission control device, to restore the NOx trapping performance of a NOx catalyst for regeneration of the NOx catalyst, a NOx-reducing control process in which NOx trapped by the NOx catalyst is reduced and the reduced NOx is released is carried out as follows: A target equivalent ratio of the air-fuel ratio is calculated such that it becomes equal to a rich value not smaller than 1, and a target intake air amount is calculated based on the calculated target equivalent ratio and the load on the engine. The intake air amount is controlled such that it becomes equal to the calculated target intake air amount. Further, the fuel injection amount of the engine is calculated according to the target equivalent ratio and a detected intake air amount. With the above-described NOx-reducing control process, the reducing condition of exhaust gases flowing into the NOx catalyst is controlled to a predetermined reducing condition, whereby NOx trapped by the NOx catalyst is reduced and the reduced NOX is released so as to regenerate the NOx catalyst.

Further, in a case where the target intake air amount is smaller than a minimum controllable intake air amount, and hence it is impossible to control the intake air amount to the target intake air amount and sufficiently control the exhaust gases to the reducing condition, the deficiency is compensated for by post injection, that is, injection of fuel during the expansion stroke or the exhaust stroke of the engine. Further, during a transient operation of the engine in which the difference between the target intake air amount and the intake air amount is large, the NOx-reducing control process is not performed, and the fuel injection amount is calculated not according to the intake air amount but according to the load on the engine. This prevents torque variation from occurring due to calculation of too large or too small a fuel injection amount, during the transient operation of the engine as described above.

Fuel injected during the expansion stroke or the exhaust stroke by the post injection is not burned in the engine but is burned in the exhaust system including the NOx catalyst, whereby the temperature of the NOx catalyst is increased. Therefore, as the amount of post-injected fuel (hereinafter referred to as "the post injection amount") is increased, the temperature of the NOx catalyst is increased. On the other hand, in the conventional exhaust emission control device, fuel is post-injected in the fuel injection amount calculated according to the intake air amount during execution of the NOx-reducing control process, as described above. As a result, e.g. when the temperature of the NOx catalyst is very high, if the load on the engine increases to increase the intake air amount, there is a fear that the post injection amount is accordingly increased to make the temperature of the NOx catalyst so high as will cause the NOx catalyst to be damaged by melting.

Further, the NOx catalyst of this kind has the following characteristics: The NOx catalyst traps not only NOx but also SOx contained in exhaust gases, and as the amount of the trapped SOx becomes larger, the NOx trapping performance thereof is lowered. Further, when the temperature thereof is within a predetermined relatively high temperature range, and at the same time the exhaust gases are in a predetermined reducing condition, the NOx catalyst reduces the trapped SOx and releases the reduced SOx. In view of these characteristics, there has been proposed a SOx-reducing control process in which the trapped SOx is caused to be reduced and the reduced SOx is released e.g. by controlling the temperature of the NOx catalyst so as to thereby regenerate the NOx catalyst.

If the SOx-reducing control process is carried out in the same manner as the above-described NOx-reducing control process by the conventional exhaust emission control device, fuel is post-injected in the fuel injection amount calculated according to the intake air amount. Therefore, during execution of the SOx-reducing control process, as the intake air amount is reduced, the post injection amount is reduced, so that the temperature of the NOx catalyst sometimes becomes lower than the above-described predetermined temperature range. In this case, it is impossible to properly reduce SOx and cause the reduced SOx to be released, which makes it impossible to properly regenerate the NOx catalyst.

SUMMARY OF THE INVENTION

It is an object of the present invention to provide an exhaust emission control device and device for an internal combustion engine and an engine control unit, which are capable of properly regenerating a NOx catalyst, while properly controlling the temperature of the NOx catalyst and ensuring excellent drivability.

To attain the above object, in a first aspect of the present invention, there is provided an exhaust emission control device for an internal combustion engine, comprising a NOx catalyst that is disposed in an exhaust system of the engine, for trapping NOx in exhaust gases, exhaust-gas reducing condition-detecting means for detecting a reducing condition of exhaust gases flowing into the NOx catalyst, main fuel supply means for supplying main fuel for obtaining an output of the engine, auxiliary fuel supply means for supplying auxiliary fuel for regenerating the NOx catalyst, first feedback control means for feedback-controlling the detected reducing condition of exhaust gases to a predetermined reducing condition, by controlling an amount of the main fuel supplied from the main fuel supply means, as a regeneration operation for regenerating the NOx catalyst, second feedback control means for feedback-controlling the reducing condition of exhaust gases to the predetermined reducing condition, by controlling an amount of the auxiliary fuel supplied from the auxiliary fuel supply means, as the regeneration operation, regeneration operation mode-determining means for determining whether or not the regeneration operation should be executed in a catalyst temperature control mode for controlling a temperature of the NOx catalyst, and selection means operable when the regeneration operation should be executed in the catalyst temperature control mode as a result of determination by the regeneration operation mode-determining means, to select the first feedback control means, and when the regeneration operation should be executed not in the catalyst temperature control mode, as the result of the determination, to select the second feedback control means.

With the configuration of this exhaust emission control device, the main fuel supply means supplies main fuel for obtaining the output of the engine, and the auxiliary fuel supply means supplies auxiliary fuel for regenerating the NOx catalyst. Further, the first feedback control means feedback-controls the detected reducing condition of exhaust gases to the predetermined reducing condition, by controlling the amount of the main fuel, as the NOx catalyst-regenerating operation for reducing NOx and the like trapped by the NOx catalyst and causing the NOx catalyst to release the reduced NOx and like. Further, the second feedback control means feedback-controls the reducing condition of exhaust gases to the predetermined reducing condition, by controlling the amount of the auxiliary fuel, as the regeneration operation.

The main fuel is for obtaining the output of the engine. The main fuel is burned in the engine to thereby generate exhaust gases, and hence as the amount of the main fuel changes, the concentration of oxygen in exhaust gases flowing into the NOx catalyst changes to change the reducing condition of exhaust gases. Further, the auxiliary fuel, which is supplied for regenerating the NOx catalyst, is not burned in the engine but burned in the exhaust system including the NOx catalyst, or is supplied to the NOx catalyst, and hence, as the amount of the main fuel is changed, the concentration of oxygen in exhaust gases changes to change the reducing condition of exhaust gases. Thus, the amount of the main fuel and the mount of the auxiliary fuel both have a relatively large influence on the reducing condition of exhaust gases. Therefore, it is possible to properly feedback-control the reducing condition of exhaust gases to the predetermined reducing condition by either of the control of the amount of the main fuel by the first feedback control means and the control of the amount of the auxiliary fuel by the second feedback control means, thereby properly regenerating the NOx catalyst.

Further, the main fuel is mainly burned in the engine so as to obtain the output of the engine, and hence the change in the amount of the main fuel has a large influence on the output of the engine, and a small influence on the temperature of the catalyst. On the other hand, the auxiliary fuel is not burned in the engine but burned in the exhaust system including the NOx catalyst, so that the change in the amount of the auxiliary fuel has a large influence on the temperature of the NOx catalyst, and a small influence on the change in the output of the engine.

With the configuration of the first aspect of the present invention, it is determined whether or not the regeneration operation for regenerating the NOx catalyst should be carried out in the catalyst temperature control mode for controlling the temperature of the NOx catalyst. When the regeneration operation is to be carried out in the catalyst temperature control mode, the first feedback control means is selected, and the amount of the main fuel is used as a parameter for feedback-controlling the reducing condition of exhaust gases to the predetermined reducing condition. This makes it possible to properly feedback-control the reducing condition of exhaust gases to the predetermined reducing condition. Further, by causing the mount of the auxiliary fuel that has a large influence on the temperature of the NOx catalyst, as described above, not to be feedback-controlled, the mount of the auxiliary fuel is prevented from being changed by the feedback control, which makes it possible to properly control the temperature of the NOx catalyst.

On the other hand, when the regeneration operation for regenerating the NOx catalyst is to be carried out not in the catalyst temperature control mode, the second feedback control means is selected, and the amount of the auxiliary fuel is used as a parameter for feedback-controlling the reducing condition of exhaust gases. This makes it possible to properly feedback-control the reducing condition of exhaust gases to the predetermined reducing condition, and by causing the mount of the main fuel that has a large influence on the output of the engine, as described above, not be feedback-controlled, the mount of the main fuel is prevented from being changed by the feedback control, which makes it possible to obtain a desired output of the engine dependent on the load on the engine and the like, thereby ensuring excellent drivability. It should be noted that throughout the specification, "detection" includes calculation or estimation by computation.

Preferably, the exhaust emission control device further comprises load-detecting means for detecting load on the engine, and when the detected load on the engine is within a predetermined high-load region, the regeneration operation mode-determining means determines that the regeneration operation should be executed in the catalyst temperature control mode.

When the load on the engine is within the predetermined high-load region, the temperature of exhaust gases is high and the temperature of the NOx catalyst is relatively high. Further, as described above, by selecting the first feedback control means, it is possible to regenerate the NOx catalyst while properly controlling the temperature of the NOx catalyst as the regeneration operation. With the configuration of the preferred embodiment, When the load on the engine is within the predetermined high-load region, it is determined that the regeneration operation should be executed in the catalyst temperature control mode, and accordingly the first feedback control means is selected, so that it is possible to prevent the NOx catalyst from being overheated and damaged by melting.

Preferably, the exhaust emission control device further comprises SOx-reducing regeneration operation-determining means for determining whether or not the regeneration operation should be executed so as to reduce SOx trapped by the NOx catalyst and cause the NOx catalyst to release the reduced SOx, and when the SOx-reducing regeneration operation-determining means determines that the regeneration operation should be executed, the regeneration operation mode-determining means determines that the regeneration operation should be executed in the catalyst temperature control mode.

With the configuration of the preferred embodiment, when it is determined that the regeneration operation should be executed so as to reduce SOx trapped by the NOx catalyst and cause the NOx catalyst to release the reduced SOx, the first feedback control means is selected. The NOx catalyst of the above-mentioned kind has a characteristic of reducing trapped SOx and causing the NOx catalyst to release the reduced SOx, when the temperature thereof is within a predetermined relatively high temperature range and at the same time the exhaust gases are in the predetermined reducing condition. With the configuration of the preferred embodiment, the first feedback control means is selected when the regeneration operation should be performed for reducing SOx, so that it is possible to control the temperature of the NOx catalyst within the above-described predetermined temperature range optimum for reduction of SOx, and feedback-control the exhaust gases to the predetermined reducing condition. This makes it possible to properly reduce SOx trapped by the NOx catalyst and cause the NOx catalyst to release the reduced SOx.

To attain the object, in a second aspect of the present invention, there is provided an exhaust emission control method for an internal combustion engine including a NOx catalyst that is disposed in an exhaust system of the engine, for trapping NOx in exhaust gases, comprising an exhaust-gas reducing condition-detecting step of detecting a reducing condition of exhaust gases flowing into the NOx catalyst, a main fuel supply step of supplying main fuel for obtaining an output of the engine, an auxiliary fuel supply step of supplying auxiliary fuel for regenerating the NOx catalyst, a first feedback control step of feedback-controlling the detected reducing condition of exhaust gases to a predetermined reducing condition, by controlling an amount of the main fuel supplied in the main fuel supply step, as a regeneration operation for regenerating the NOx catalyst, a second feedback control step of feedback-controlling the reducing condition of exhaust gases to the predetermined reducing condition, by controlling an amount of the auxiliary fuel supplied in the auxiliary fuel supply step, as the regeneration operation, a regeneration operation mode-determining step of determining whether or not the regeneration operation should be executed in a catalyst temperature control mode for controlling a temperature of the NOx catalyst, and a selection step of selecting the first feedback control step when the regeneration operation should be executed in the catalyst temperature control mode as a result of determination in the regeneration operation mode-determining step, and selecting the second feedback control step when the regeneration operation should be executed not in the catalyst temperature control mode, as the result of the determination.

With the configuration of the second aspect of the present invention, it is possible to obtain the same advantageous effects as provided by the first aspect of the present invention.

Preferably, the exhaust emission control method further comprises a load-detecting step of detecting load on the engine, and when the detected load on the engine is within a predetermined high-load region, it is determined in the regeneration operation mode-determining step that the regeneration operation should be executed in the catalyst temperature control mode.

Preferably, the exhaust emission control method further comprises a SOx-reducing regeneration operation-determining step of determining whether or not the regeneration operation should be executed so as to reduce SOx trapped by the NOx catalyst and cause the NOx catalyst to release the reduced SOx, and when it is determined in the SOx-reducing regeneration operation-determining step that the regeneration operation should be executed, it is determined in the regeneration operation mode-determining step that the regeneration operation should be executed in the catalyst temperature control mode.

With the configuration of the preferred embodiment, it is possible to obtain the same advantageous effects as provided by the respective corresponding preferred embodiments of the first aspect of the present invention.

To attain the object, in a third aspect of the present invention, there is provided an engine control unit including a control program for causing a computer to execute an exhaust emission control method for an internal combustion engine including a NOx catalyst that is disposed in an exhaust system of the engine, for trapping NOx in exhaust gases, wherein the control program causes the computer to detect a reducing condition of exhaust gases flowing into the NOx catalyst, supply main fuel for obtaining an output of the engine, supply auxiliary fuel for regenerating the NOx catalyst, feedback-control the detected reducing condition of exhaust gases to a predetermined reducing condition, by controlling an amount of the main fuel, as a regeneration operation for regenerating the NOx catalyst, feedback-control the reducing condition of exhaust gases to the predetermined reducing condition, by controlling an amount of the auxiliary fuel, as the regeneration operation, determine whether or not the regeneration operation should be executed in a catalyst temperature control mode for controlling a temperature of the NOx catalyst, and select the control of the amount of the main fuel when the regeneration operation should be executed in the catalyst temperature control mode as a result of the determination, and select the control of the amount of the auxiliary fuel when the regeneration operation should be executed not in the catalyst temperature control mode, as the result of the determination.

With the configuration of the third aspect of the present invention, it is possible to obtain the same advantageous effects as provided by the first aspect of the present invention.

Preferably, the control program causes the computer to detect load on the engine, and when the detected load on the engine is within a predetermined high-load region, the control program causes the computer to determine that the regeneration operation should be executed in the catalyst temperature control mode.

Preferably, the control program causes the computer to determine whether or not the regeneration operation should be executed so as to reduce SOx trapped by the NOx catalyst and cause the NOx catalyst to release the reduced SOx, and when it is determined that the regeneration operation should be executed, as a result of the determination, the control program causes the computer to determine that the regeneration operation should be executed in the catalyst temperature control mode.

With the configuration of the preferred embodiment, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 9 is a flowchart showing a subroutine of a first NOx-reducing control process executed in a step 6 in FIG. 3.

DETAILED DESCRIPTION OF PREFERRED EMBODIMENT

The invention will now be described in detail with reference to the drawings showing preferred embodiment thereof.

Figure 1:
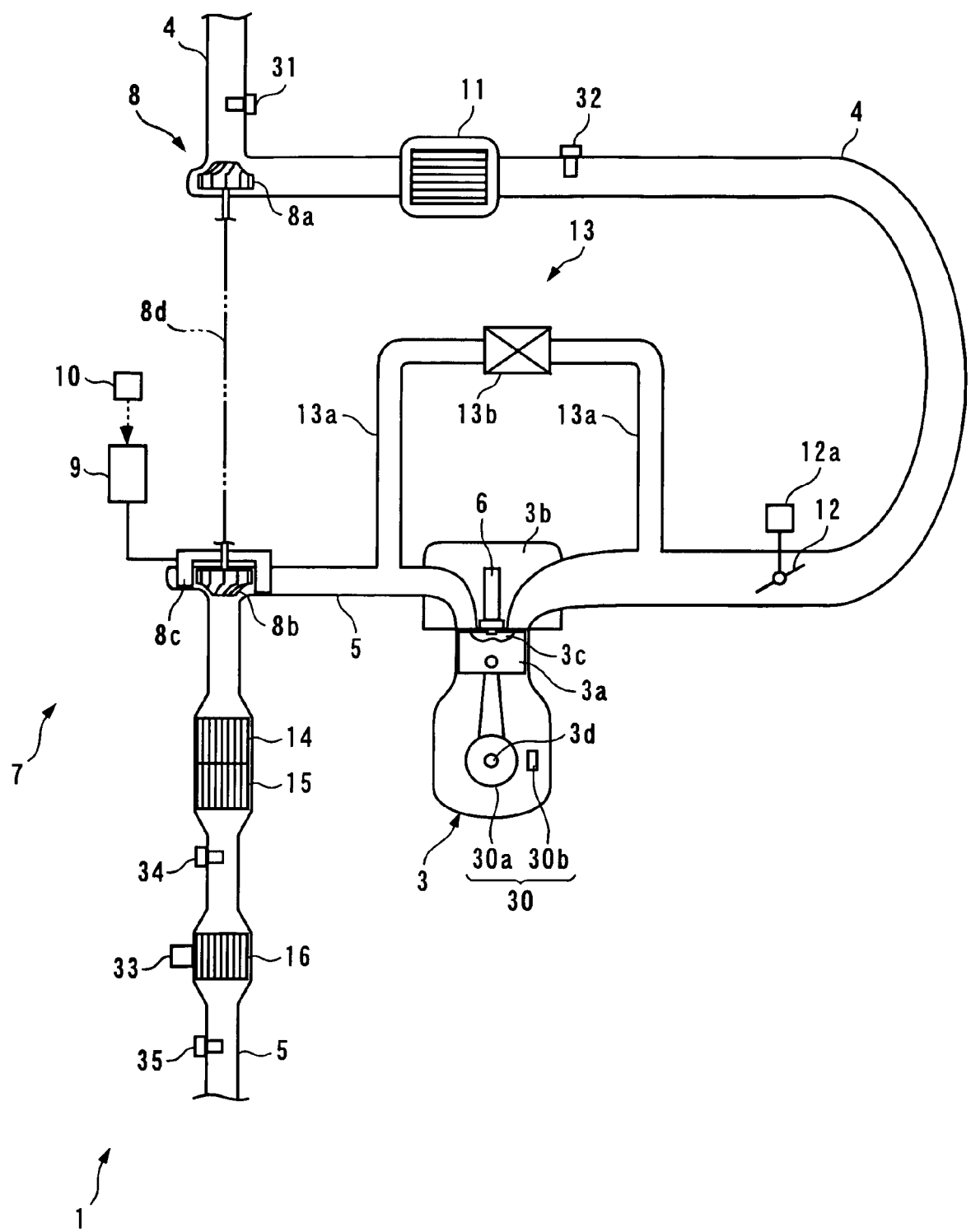
FIG. 1 is a schematic diagram of an exhaust emission control device according to an embodiment of the present invention, and an internal combustion engine to which is applied the exhaust emission control device.

FIG. 1 schematically shows an exhaust emission control device 1 according to the present embodiment, and an internal combustion engine 3 to which is applied the exhaust emission control device 1. The internal combustion engine (hereinafter simply referred to as "the engine") 3 is a diesel engine that has in-line four cylinders (only one of which is shown), and is installed on a vehicle, not shown.

A combustion chamber 3c is defined between a piston 3a and a cylinder head 3b for each cylinder of the engine 3. The cylinder head 3b has an intake pipe 4 and an exhaust pipe 5 connected thereto, with a fuel injection valve (hereinafter referred to as "the injector") 6 (main fuel supply means and auxiliary fuel supply means) mounted therethrough such that it faces the combustion chamber 3c.

Figure 2:
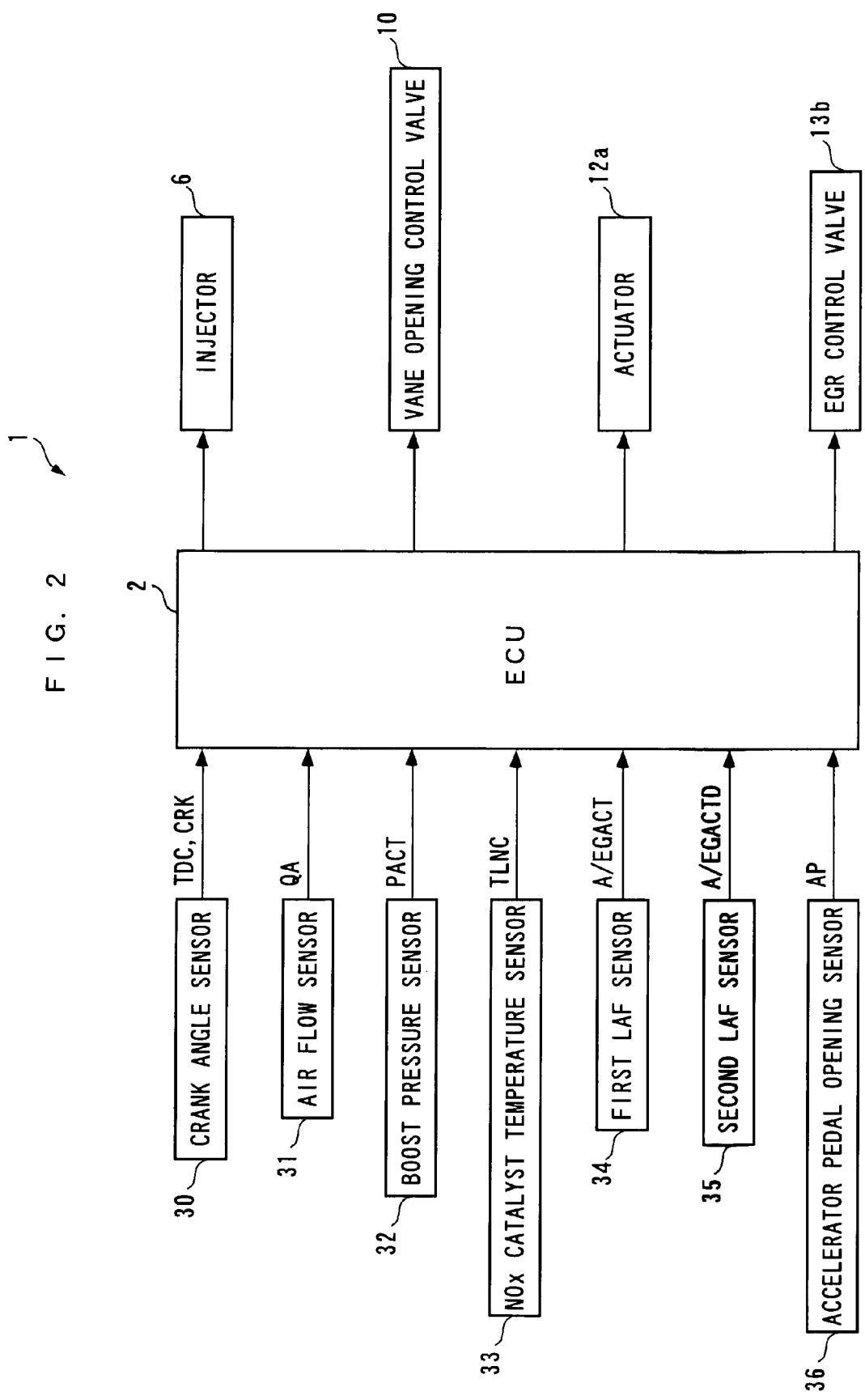
FIG. 2 is a schematic diagram of part of the exhaust emission control device according to the present embodiment.

The injector 6 is inserted into the combustion chamber 3c through a central portion of the top wall thereof, and is connected to a high-pressure pump and a fuel tank, neither of which is shown, in the mentioned order via a common rail. A fuel injection amount and fuel injection timing of fuel injected from the injector 6 are controlled by a drive signal from an ECU 2, referred to hereinafter, of the exhaust emission control device 1 (see FIG. 2).

A magnet rotor 30a is mounted on a crankshaft 3d of the engine 3. The magnet rotor 30a and an MRE pickup 30b form a crank angle sensor 30 which delivers a CRK signal and a TDC signal, which are both pulse signals, to the ECU 2 along with rotation of the crankshaft 3d.

Each pulse of the CRK signal is generated whenever the crankshaft 3d rotates through a predetermined crank angle (e.g. 30°). The ECU 2 calculates rotational speed (hereinafter referred to as "the engine speed") NE of the engine 3 based on the CRK signal. The TDC signal indicates that the piston 3a of each cylinder is at a predetermined crank angle position in the vicinity of the top dead center (TDC) at the start of the suction stroke thereof, and in the case of the four-cylinder engine of the illustrated example, it is delivered whenever the crankshaft 3d rotates through 180 degrees.

The engine 3 has a supercharging device 7 disposed therein. The supercharging device 7 is comprised of a supercharger 8 formed by a turbo charger, an actuator 9 connected to the supercharger 8, and a vane opening control valve 10.

The supercharger 8 includes a compressor blade 8a rotatably mounted in the intake pipe 4, a rotatable turbine blade 8b and a plurality of rotatable variable vanes 8c (only two of which are shown) provided in the exhaust pipe 5, and a shaft 8d integrally formed with the two blades 8a and 8b such that the shaft 8d connects them. In the supercharger 8, as the turbine blade 8b is driven for rotation by exhaust gases flowing through the exhaust pipe 5, the compressor blade 8a integrally formed with the turbine blade 8b is also rotated, whereby the supercharger 8 is caused to perform a supercharging operation for pressurizing intake air in the intake pipe 4.

The actuator 9 is of a diaphragm type which is operated by negative pressure, and is mechanically connected to the respective variable vanes 8c. The actuator 9 has negative pressure supplied from a negative pressure pump, not shown, through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of each variable vane 8c. Thus, boost pressure is controlled.

An intercooler 11 of a water cooling type, and a throttle valve 12 are inserted into the intake pipe 4 at respective locations downstream of the supercharger 8 from upstream to downstream in the mentioned order. The intercooler 11 is provided for cooling intake air e.g. when the temperature of the intake air made higher by the supercharging operation of the supercharging device 7. An actuator 12a comprised e.g. of a DC motor is connected to the throttle valve 12. The opening TH of the throttle valve 12 (hereinafter referred to as "the throttle valve opening TH") is controlled by controlling the duty factor of electric current supplied to the actuator 12a by the ECU 2, whereby the amount of intake air (hereinafter also referred to as "the intake air amount QA") is controlled.

Further, the intake pipe 4 has an air flow sensor 31 inserted therein at a location upstream of the supercharger 8, and a boost pressure sensor 32 inserted therein between the intercooler 11 and the throttle valve 12. The air flow sensor 31 detects the intake air amount QA, to deliver a signal indicative of the sensed intake air amount QA to the ECU 2, while the boost pressure sensor 32 detects boost pressure PACT in the intake pipe 4, to deliver a signal indicative of the sensed boost pressure PACT to the ECU 2.

Further, the engine 3 is provided with an EGR device 13 that has an EGR pipe 13a and an EGR control valve 13b. The EGR pipe 13a connects between a portion of the intake pipe 4 at a location downstream of the throttle valve 12 and a portion of the exhaust pipe 5 at a location downstream of the supercharger 8. Part of exhaust gases exhausted from the engine 3 is recirculated into the intake pipe 4 via the EGR pipe 14a as EGR gases, whereby combustion temperature in the combustion chamber 3c is lowered to decrease NOx contained in the exhaust gases.

The EGR control valve 13b is implemented by a linear solenoid valve inserted into the EGR pipe 13a, and the valve lift amount thereof is controlled by a drive signal from the ECU 2, whereby the amount of EGR gases is controlled.

A three-way catalyst 14, a filter 15 and a NOx catalyst 16 are provided in the exhaust pipe 5 at respective locations downstream of the supercharger 8 from upstream to downstream in the mentioned order. The three-way catalyst 16 oxidizes HC and CO and performs reduction of NOx in exhaust gases under a stoichiometric atmosphere, to thereby purify i.e. decrease exhaust emissions. The filter 15 is configured such that it collects particulates (hereinafter simply referred to as "PM" (Particulate Matter)), such as soot, from exhaust gases to thereby reduce the amount of PM emitted into the air. It should be noted that an oxidation catalyst, which purifies exhaust emissions by oxidizing HC and CO in exhaust gases, may be used in place of the three-way catalyst 14.

The above-described NOx catalyst 16 traps NOx contained in exhaust gases under an oxidizing atmosphere in which the concentration of oxygen in exhaust gases is higher than the concentration of reducing agents, such as HC and CO, contained in the exhaust gases. Inversely, under a reducing atmosphere in which the concentration of reducing agents in exhaust gases is higher than the concentration of oxygen in the exhaust gases, the NOx catalyst 16 performs reduction of the trapped NOx using the reducing agents, to thereby purify exhaust emissions. Further, the NOx catalyst 16 traps SOx contained in exhaust gases, and when the temperature of the SOx is not lower than a relatively high predetermined reducing temperature (e.g. 500° C.) and at the same time, the exhaust gases are under a reducing atmosphere, the NOx catalyst 16 reduces the trapped SOx using the reducing agents in the exhaust gases and releases the reduced SOx.

Furthermore, the NOx catalyst 16 is provided with a NOx catalyst temperature sensor 33 for detecting the temperature TLNC of the NOx catalyst 16 (hereinafter referred to as "the catalyst temperature TLNC"), and delivers a signal indicative of the sensed catalyst temperature TLNC to the ECU 2. Further, first and second LAF sensors 34 and 35 are inserted into the exhaust pipe 5 at respective locations immediately upstream and downstream of the NOx catalyst 16. Each of the first and second LAF sensors 34 and 35 linearly detects the concentration of oxygen in exhaust gases in a broad air-fuel ratio range from a rich region to a lean region, and delivers a signal indicative of the sensed oxygen concentration to the ECU 2. Hereinafter, the concentration of oxygen in exhaust gases, detected by the first LAF sensor 34, is referred to as "the exhaust gas oxygen concentration A/EGACT", and the concentration of oxygen in exhaust gases, detected by the second LAF sensor 35, is referred to as "the downstream exhaust gas oxygen concentration A/EGACTD". In the present embodiment, the first LAF sensor 34 corresponds to exhaust-gas reducing condition-detecting means, and the exhaust gas oxygen concentration A/EGACT corresponds to the reducing condition of exhaust gases.

Further, an accelerator pedal opening sensor 36 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

The ECU 2 is implemented by a microcomputer comprised of an I/O interface, a CPU, a RAM, and a ROM. The detection signals from the aforementioned sensors 30 to 36 are input to the CPU after the I/O interface performs A/D conversion and waveform shaping thereon. Further, in response to these detection signals, the ECU 2 determines an operating condition of the engine 3, and based on the determined operating condition of the engine, performs engine control, such as control of the fuel injection amount of the injector 6 and the intake air amount QA, in accordance with control programs read from the ROM.

Further, the ECU 2 performs reduction control for reducing NOx and SOx trapped by the NOx catalyst 16 and causing the reduced NOx and SOx to be released therefrom, to thereby restore the NOx trapping performance of the NOx catalyst to regenerate the NOx catalyst 16. In the reduction control, basically, the ECU 2 performs not only main injection in which fuel is injected from the injector 6 during the compression stroke to obtain output of the engine 3 but also post injection in which fuel is injected from the injector 6 in predetermined timing between the expansion stroke and the exhaust stroke, for reduction of NOx and SOx.

In the present embodiment, the ECU 2 corresponds to the main fuel supply means, the auxiliary fuel supply means, first feedback control means, second feedback control means, regeneration operation mode-determining means, selection means, load-detecting means, and SOx-reducing regeneration operation-determining means.

Figure 3:
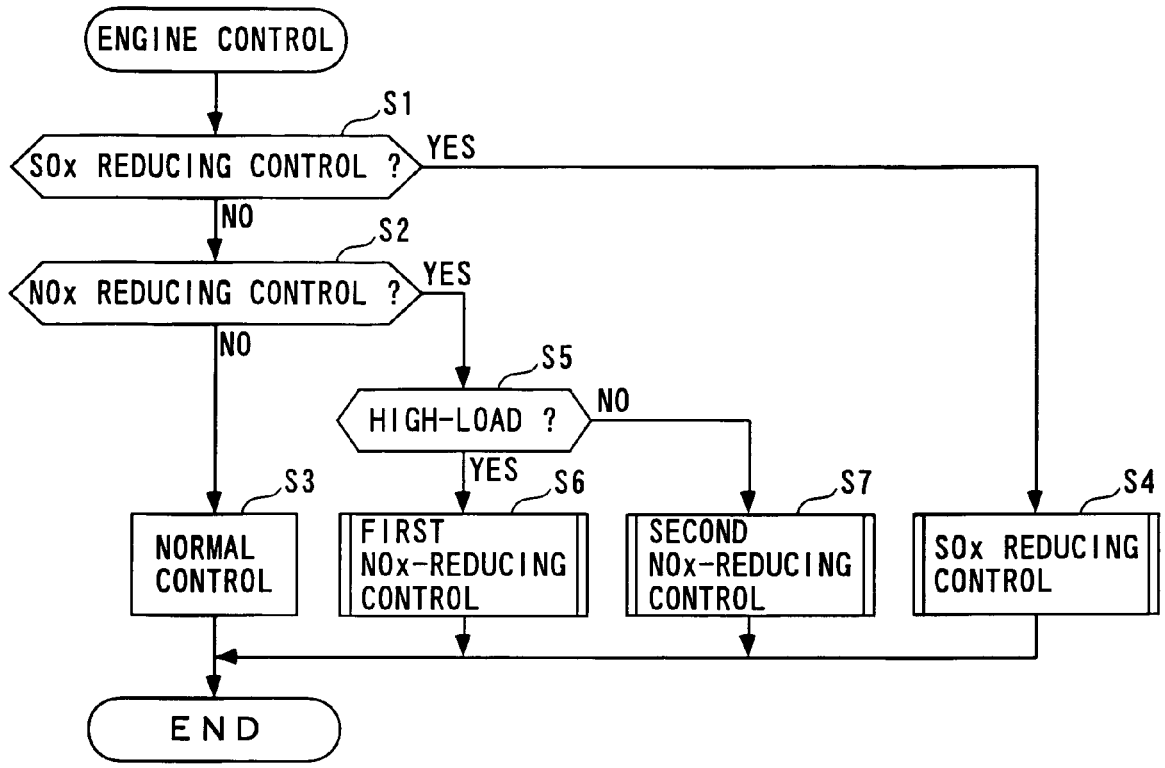
FIG. 3 is a flowchart showing an engine control process.

FIG. 3 shows an engine control process including the above-described reduction control. First, in a step 1 (shown as S1 in abbreviated form in FIG. 3; the following steps are also shown in abbreviated form), it is determined whether or not SOx-reducing control should be executed for reducing SOx trapped by the NOx catalyst 16 and causing the catalyst 16 to release the reduced SOx. In the step 1, it is determined that the SOx-reducing control should be carried out when there are satisfied all the following conditions (a) to (c):

(a) The cumulative value of the amount QINJ (main fuel amount) of fuel injected by the above-mentioned main injection (hereinafter referred to as "the main injection amount") is not smaller than a predetermined value.

(b) Conditions for executing a regeneration control process for regenerating the filter 15.

(c) Predetermined conditions based on the relationship between the exhaust gas oxygen concentration A/EGACT and the downstream exhaust gas oxygen concentration A/EGACTD.

If the answer to the question of the step 1 is negative (NO), i.e. if the SOx-reducing control should not be executed, it is determined whether or not NOx-reducing control should be executed for reducing NOx trapped by the NOx catalyst 16 and causing the NOx catalyst 16 to release the reduced NOx (step 2). This determination is carried out as follows: The amount of NOx trapped by the NOx catalyst 16 (trapped NOx amount) is calculated by searching a trapped NOx amount map, not shown, according to the engine speed NE and torque PMCMD demanded of the engine 3 (demanded torque PMCMD), and is subjected to cumulative calculation thereof. When the cumulative value of the amount of trapped NOx obtained by the cumulative calculation is not smaller than a predetermined reference value, it is determined that the NOx-reducing control should be executed.

Figure 4:
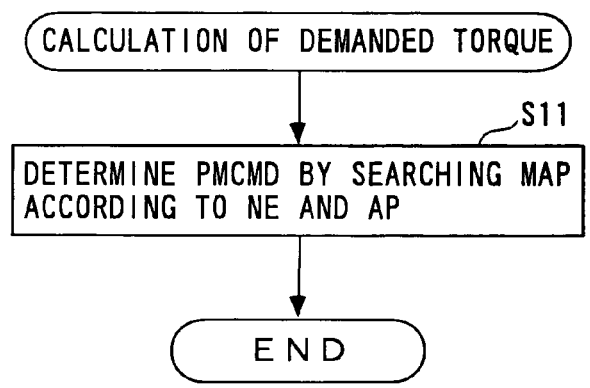
FIG. 4 is a flowchart showing a demanded torque-calculating process.

The above-mentioned demanded torque PMCMD is calculated in a step 11 in a demanded torque-calculating process shown in FIG. 4 by searching a map, not shown, according to the engine speed NE and the accelerator pedal opening AP.

If the answer to the question of the step 2 is negative (NO), i.e. if neither the SOx-reducing control nor the NOx-reducing control should be executed, a normal control process is carries out (step 3), followed by terminating the present process.

The normal control process is carried out as follows: A normal injection amount LQINJ is calculated by searching an LQINJ map, not shown, according to the engine speed NE and the demanded torque PMCMD, and is set as the main injection amount QINJ. Then, the amount of fuel corresponding to the set main injection amount QINJ is injected from the injector 6 during the compression stroke.

Further, the intake air amount QA is controlled as follows: First, a target intake air amount is calculated by searching a map, not shown, according to the engine speed NE and the demanded torque PMCMD. Then, the throttle valve opening TH, boost pressure, and the amount of EGR gases are controlled such that the intake air amount QA becomes equal to the calculated target intake air amount. Through these operations in the normal control process, the air-fuel ratio of a mixture supplied to the engine 3 is controlled to a leaner value than the stoichiometric fuel-air ratio.

Figure 6:
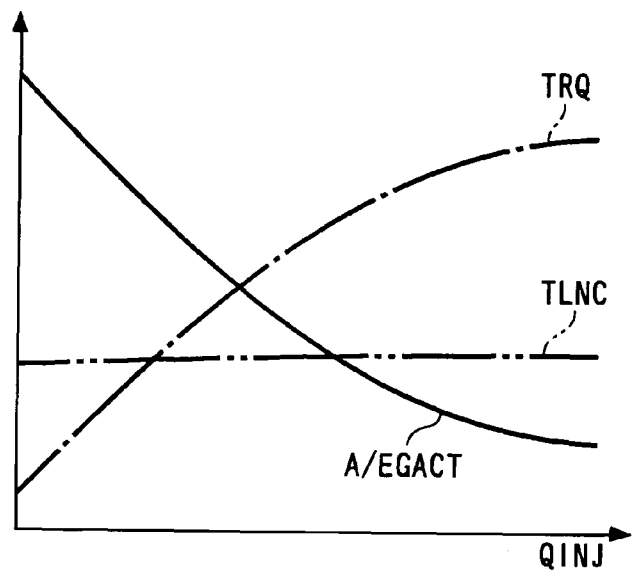
FIG. 6 is a diagram showing the relationship between a main injection amount, oxygen concentration in exhaust gases, engine torque, and the temperature of a catalyst.

On the other hand, if the answer to the question of the step 1 is affirmative (YES), i.e. if the SOx-reducing control should be executed, a SOx-reducing control process is carries out (step 4), followed by terminating the present process. In the SOx-reducing control process, attention is paid to points mentioned below, and the main injection amount QINJ and the amount QPOST (auxiliary fuel amount) of fuel injected by the aforementioned post injection (hereinafter referred to as "the post injection amount QPOST") are calculated as follows:

Assuming that the intake air amount QA is constant, as shown in FIG. 6, when the main injection amount QINJ is changed, the exhaust gas oxygen concentration A/EGACT and the engine torque TRQ change accordingly, but the catalyst temperature TLNC hardly changes. Thus, the main injection amount QINJ has a large influence on both the exhaust gas oxygen concentration A/EGACT and the engine torque TRQ but a small influence on the catalyst temperature TLNC.

Figure 7:
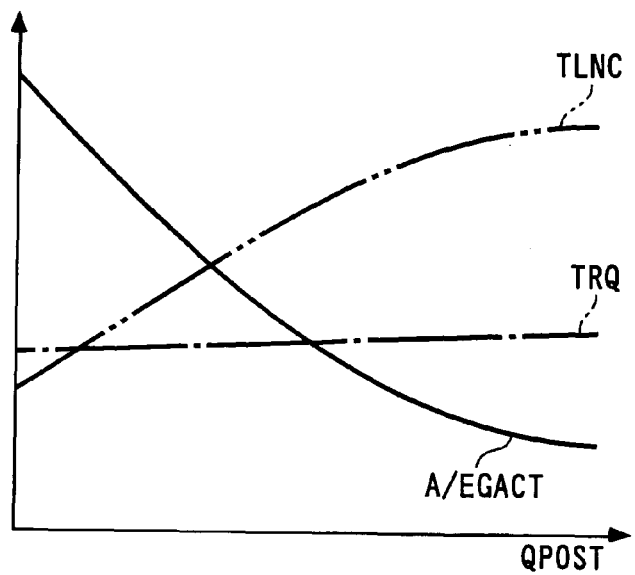
FIG. 7 is a diagram showing the relationship between a post injection amount, the oxygen concentration in exhaust gases, the engine torque, and the temperature of the catalyst.

Further, since the post injection is carried out during the compression stroke or the exhaust stroke, fuel injected by the post injection is not burned in the engine 3 but burned in the three-way catalyst 14 or supplied to the NOx catalyst 16. Therefore, if the intake air amount QA is constant, as shown in FIG. 7, when the post injection amount QPOST is changed, the exhaust gas oxygen concentration A/EGACT and the catalyst temperature TLNC change accordingly, but the engine torque TRQ hardly changes. Thus, the post injection amount QPOST has a large influence on both the exhaust gas oxygen concentration A/EGACT and the catalyst temperature TLNC but a small influence on the engine torque TRQ.

Figure 8:
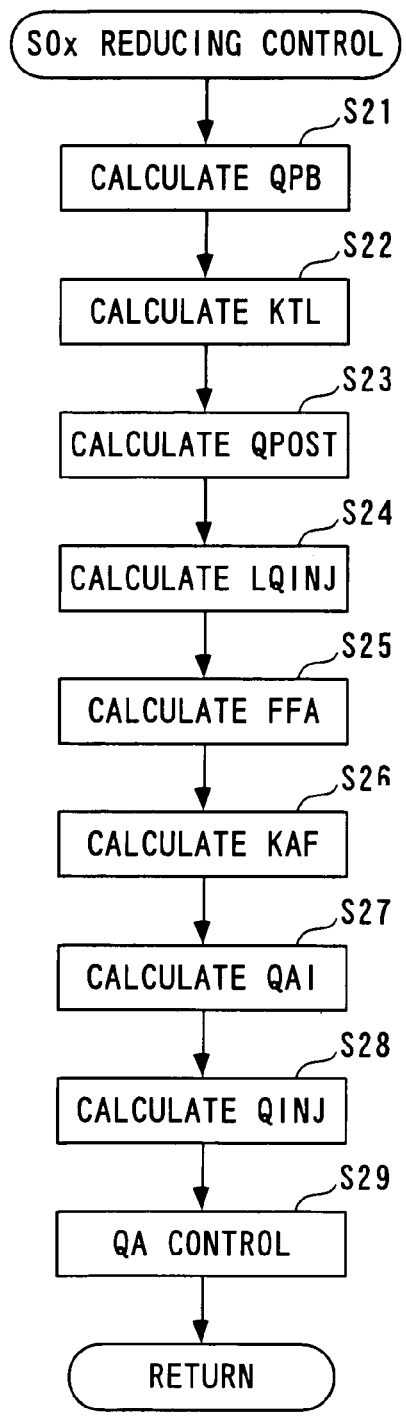
FIG. 8 is a flowchart showing a subroutine of a SOx-reducing control process executed in a step 4 in FIG. 3.

In the SOx-reducing control process, with attention paid to the above points, the main injection amount QINJ that has a large influence on the exhaust gas oxygen concentration A/EGACT and at the same time a small influence on the catalyst temperature TLNC is calculated such that the exhaust gas oxygen concentration A/EGACT becomes equal to a predetermined reduction concentration A/EGREF (predetermined reducing condition). Further, the post injection amount QPOST that has a large influence on the catalyst temperature TLNC is calculated such that the catalyst temperature TLNC becomes equal to a target temperature TCMD. The reduction concentration A/EGREF is determined by empirically determining the concentration of oxygen in exhaust gases when exhaust gases are under the aforementioned reducing atmosphere. For example, the reduction concentration A/EGREF is set to the concentration of oxygen in exhaust gases which is obtained when the air-fuel ratio of the mixture burned in the engine 3 is equal to a predetermined value within a range of 12 to 14.5. Further, the above-described target temperature TCMD is set to a temperature, e.g. 55° C., which is higher than the aforementioned reducing temperature and at the same time prevents melting of the NOx catalyst 16. The SOx-reducing control process will be described hereafter with reference to FIG. 8.

First, in a step 21, a basic post injection amount QPB is calculated by searching a QPB map, not shown, according to the engine speed NE and the demanded torque PMCMD. Next, a feedback correction coefficient KTL is calculated based on the difference between the catalyst temperature TLNC and the target temperature TCMD with a predetermined feedback control algorithm (step 22). Then, the post injection amount QPOST is calculated by multiplying the basic post injection amount QPB by the calculated feedback correction coefficient KTL, and fuel is injected in an amount corresponding to the calculated post injection amount QPOST from the injector 6 during the expansion stroke or the exhaust stroke (step 23).

Then, the normal injection amount LQINJ is calculated by searching the aforementioned LQINJ map, not shown, according to the engine speed NE and the demanded torque PMCMD (step 24). Then, an F/F addition term FFA, which is a positive value, is calculated by searching an FFA map, not shown, according to the engine speed NE and the demanded torque PMCMD (step 25). Next, a feedback correction coefficient KAF is calculated based on the difference between the exhaust gas oxygen concentration A/EGACT and the reduction concentration A/EGREF with a predetermined feedback control algorithm (step 26).

Then, a regeneration-time total injection amount QAI is calculated using the calculated normal injection amount LQINJ, F/F addition term FFA, and feedback correction coefficient KAF by the following equation (1) (step 27):

$$QAI = (LQINJ + FFA) \times KAF \quad (1)$$

Next, the main injection amount QINJ is calculated by subtracting the post injection amount QPOST calculated in the step 23 from the calculated regeneration-time total injection amount QAI (step 28), and the intake air amount QA is controlled by the same method as employed in the above-described normal control process (step 29), followed by terminating the present process.

As described above, in the SOx-reducing control process, as is apparent from the calculation method in the steps 24 to 28, the main injection amount QINJ is controlled according to the feedback correction coefficient KAF used for feedback control of the exhaust gas oxygen concentration A/EGACT to the reduction concentration A/EGREF. As a result, the air-fuel ratio of the mixture supplied to the engine 3 is controlled to a richer value than the stoichiometric fuel-air ratio, and the exhaust gas oxygen concentration A/EGACT is feedback-controlled such that it becomes equal to the reduction concentration A/EGREF. Further, the post injection amount QPOST is controlled according to the feedback correction coefficient KTL used for feedback control of the catalyst temperature TLNC to the target temperature TCMD. As a result, the catalyst temperature TLNC is feedback-controlled such that it becomes equal to the target temperature TCMD. In the present embodiment, the control of the catalyst temperature TLNC by the post injection amount QPOST corresponds to a catalyst temperature control mode.

It should be noted that in the step 29, the intake air amount QA is controlled to a smaller value than in the normal control process, and in this case, the degree of decrease of the intake air amount QA with respect to the value in the normal control process is set according to the aforementioned F/F addition term FFA. Further, after the start of the SOx-reducing control process, when a predetermined time period has elapsed, it is determined that all the SOx trapped by the NOx catalyst 16 has been reduced and the reduced SOx has been released from the NOx catalyst 16 to complete regeneration of the NOx catalyst 16, and the cumulative value of the main injection amount QINJ of the condition (a), which is used to determine whether or not the SOx-reducing control should be carried out, is reset to 0.

Further, the control of the catalyst temperature TLNC to the target temperature TCMD, which is performed using the post injection amount QPOST, may be carried out by open control, instead of the above-described feedback control, without being responsive to the detected catalyst temperature TLNC.

Figure 5:
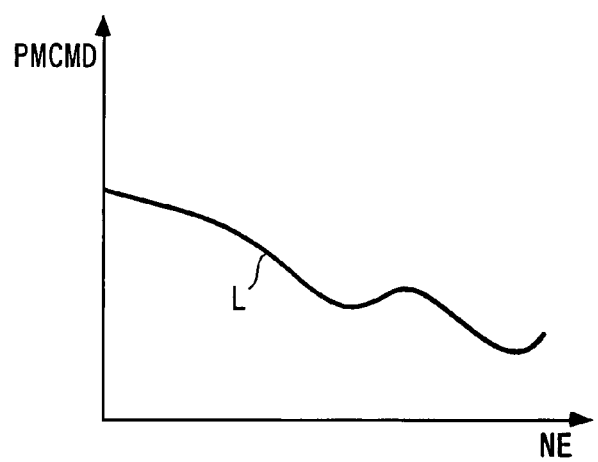
FIG. 5 is a diagram showing an example of a load determination map.

On the other hand, if the answer to the question of the step 2 is affirmative (YES), i.e. if the NOx-reducing control should be executed, it is determined whether or not the load on the engine 3 is within a predetermined high-load region (step 5). This determination is performed by searching a load determination map shown in FIG. 5 according to the engine speed NE and the demanded torque PMCMD. More specifically, in this load determination map, the high-load region and a load region other than the high-load region are divided by a boundary L, and a region where the engine speed NE and the demanded torque PMCMD exceed the boundary L is set as the high-load region.

If the answer to the question of the step 5 is affirmative (YES), i.e. if the NOx-reducing control should be executed, and at the same time, the engine 3 is within the high-load region, it is judged that the catalyst temperature TLNC should be controlled to prevent the NOx catalyst 16 in a relatively high temperature state from being overheated and damaged by melting due to the post injection, so that a first NOx-reducing control process is executed (step 6), followed by terminating the present process.

In the first NOx-reducing control process, by paying attention to the characteristics of the main injection amount QINJ and the post injection amount QPOST described with reference to FIGS. 6 and 7, the main injection amount QINJ, which has a large influence on the exhaust gas oxygen concentration A/EGACT, and at the same time a small influence on the catalyst temperature TLNC, is calculated such that the exhaust gas oxygen concentration A/EGACT becomes equal to the reduction concentration A/EGREF. Further, the post injection amount QPOST that has a large influence on the catalyst temperature TLNC is set such that the NOx catalyst 16 is not overheated. Hereinafter, the first NOx-reducing control process will be described with reference to FIG. 9.

First, in a step 31, the post injection amount QPOST is set such that the catalyst temperature TLNC becomes lower than an upper limit value TLNCH. The upper limit value TLNCH is set to a predetermined temperature, e.g. 700° C., which can prevent the NOx catalyst 16 from being melted or degraded by heat. More specifically, when the catalyst temperature TLNC is close to the upper limit value TLNCH, the post injection amount QPOST is set to 0, and otherwise set to a predetermined value.

Then, similarly to the aforementioned steps 24 to 27, the normal injection amount LQINJ, the F/F addition term FFA, the feedback correction coefficient KAF, and the regeneration-time total injection amount QAI are calculated, in respective steps 32 to 35. Next, the main injection amount QINJ is calculated by subtracting the post injection amount QPOST calculated in the step 31 from the regeneration-time total injection amount QAI calculated in the step 35 (step 36). Then, the intake air amount QA is controlled in the same manner as in the above-described SOx-reducing control process (step 37), followed by terminating the present process.

As described above, in the first NOx-reducing control process, similarly to the SOx-reducing control process, the main injection amount QINJ is controlled according to the feedback correction coefficient KAF, whereby the exhaust gas oxygen concentration A/EGACT is feedback-controlled such that it becomes equal to the reduction concentration A/EGREF. Further, by controlling the post injection amount QPOST, the catalyst temperature TLNC is controlled such that it becomes lower than the upper limit value TLNCH. In the present embodiment, the control of the catalyst temperature TLNC by the post injection amount QPOST corresponds to the catalyst temperature control mode.

It should be noted that after the start of the first NOx-reducing control process, when a predetermined time period has elapsed, it is judged that all the NOx trapped by the NOx catalyst 16 has been reduced and the reduced NOx has been released from the NOx catalyst 16 to complete regeneration of the NOx catalyst 16, and the cumulative value of the amount of the trapped NOx, which is used for determining whether or not the above-described NOx-reducing control should be carried out, is reset to 0.

On the other hand, if the answer to the question of the step 5 is negative (NO), i.e. if the NOx-reducing control should be executed, and at the same time the engine 3 is not within the high-load region, it is judged that it is not necessary to control the catalyst temperature TLNC since there is no fear of damaging the NOx catalyst 16 by melting thereof, so that a second NOx-reducing control process is executed (step 7), followed by terminating the present process.

Figure 10:
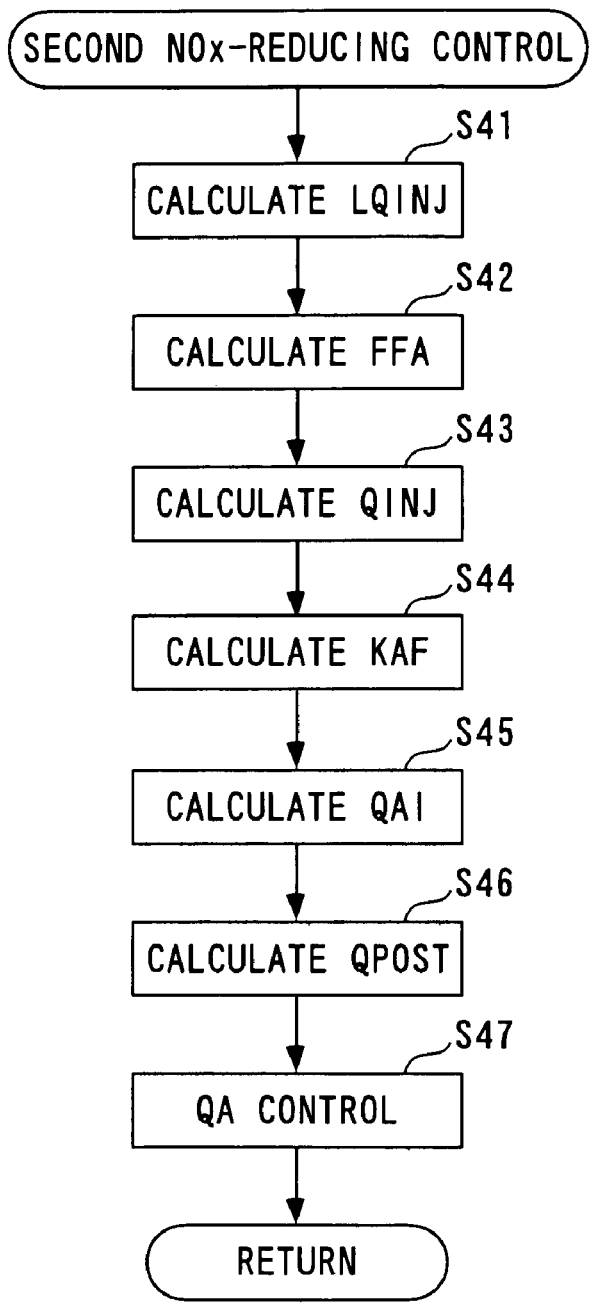
FIG. 10 is a flowchart showing a subroutine of a second NOx-reducing control process executed in a step 7 in FIG. 3.

In the second NOx-reducing control process, differently from the first NOx-reducing control process, the main injection amount QINJ and the post injection amount QPOST are calculated from the viewpoint of ensuring excellent drivability, as follows: By paying attention to the characteristics of the main injection amount QINJ and the post injection amount QPOST described with reference to FIGS. 6 and 7, the main injection amount QINJ, which has a large influence on the engine torque TRQ, is calculated according to the demanded torque PMCMD. Further, the post injection amount QPOST, which has a large influence on the exhaust gas oxygen concentration A/EGACT and at the same time a small influence on the engine torque TRQ, is calculated such that the exhaust gas oxygen concentration A/EGACT becomes equal to the reduction concentration A/EGREF. The second NOx-reducing control process will be described hereafter with reference to FIG. 10.

First, similarly to the aforementioned steps 24 and 25, the normal injection amount LQINJ and the F/F addition term FFA are calculated in respective steps 41 and 42 each according to the engine speed NE and the demanded torque PMCMD. Next, the main injection amount QINJ is calculated by adding the value of the FFA to the value of the calculated LQINJ (step 43). Then, similarly to the step 26 described above, the feedback correction coefficient KAF is calculated (step 44).

Thereafter, the regeneration-time total injection amount QAI is calculated by multiplying the main injection amount QINJ calculated in the step 43 by the feedback correction coefficient KAF calculated in the step 44 (step 45). Then, the post injection amount QPOST is calculated by subtracting the main injection amount QINJ from the regeneration-time total injection amount QAI (step 46), and the intake air amount QA is controlled, in the same manner as in the above-described SOx-reducing control process (step 47), followed by terminating the present process.

As described hereinabove, in the second NOx-reducing control process, the main injection amount QINJ is controlled to be commensurate with the demanded torque PMCMD. Further, the post injection amount QPOST is controlled according to the feedback correction coefficient KAF for controlling the exhaust gas oxygen concentration A/EGACT, whereby the exhaust gas oxygen concentration A/EGACT is feedback-controlled such that it becomes equal to the reduction concentration A/EGREF. It should be noted that similarly to the first NOx-reducing control process, after the start of the second NOx-reducing control process, when a predetermined time period has elapsed, it is judged that all the NOx trapped by the NOx catalyst 16 has been reduced and the reduced NOx has been released from the NOx catalyst 16 to complete regeneration of the NOx catalyst 16, and the aforementioned cumulative value of the amount of the trapped NOx is reset to 0.

As described heretofore, according to the present embodiment, if the NOx-reducing control should be executed, and at the same time the engine 3 is within the high-load region, the first NOx-reducing control process is carried out, whereby the exhaust gas oxygen concentration A/EGACT is feedback-controlled such that it becomes equal to the reduction concentration A/EGREF, and at the same time the catalyst temperature TLNC is controlled such that it becomes lower than the upper limit value TLNCH. Therefore, it is possible to prevent the NOx catalyst 16 from being damaged by melting, and properly reduce the NOx trapped by the NOx catalyst 16 and cause the reduced NOx to be released therefrom, whereby it is possible to properly regenerate the NOx catalyst 16.

Further, if the NOx-reducing control should be executed, and at the same time the engine 3 is not within the high-load region, the second NOx-reducing control process is carried out, whereby the main injection amount QINJ is controlled to be commensurate with the demanded torque PMCMD, and the exhaust gas oxygen concentration A/EGACT is feedback-controlled such that it becomes equal to the reduction concentration A/EGREF. Therefore, it is possible to properly reduce NOx trapped by the NOx catalyst 16 and cause the reduced NOx to be released therefrom, whereby it is possible to properly regenerate the NOx catalyst 16 while ensuring excellent drivability.

Furthermore, if the SOx-reducing control should be executed, the SOx-reducing control process is executed, whereby while controlling the catalyst temperature TLNC to the target temperature TCMD, the exhaust gas oxygen concentration A/EGACT is feedback-controlled such that it becomes equal to the reduction concentration A/EGREF. Therefore, it is possible to properly reduce SOx trapped by the NOx catalyst 16 and cause the reduces SOx to be released from the NOx catalyst 16, whereby it is possible to properly regenerate the NOx catalyst 16.

It should be noted that the present invention is by no means limited to the embodiment described above, but it can be practiced in various forms. For example, although in the above-described embodiment, auxiliary fuel in the present invention is supplied by post injection, this is not limitative, but a fuel injection valve may be provided in the exhaust pipe 5 at a location upstream of the NOx catalyst 16 such that the auxiliary fuel is supplied by the fuel injection valve. Further, although in the above-described embodiment, the exhaust gas oxygen concentration A/EGACT is used as a parameter indicative of the reducing condition of exhaust gases, this is not limitative, but any other suitable parameter may be used insofar as it is indicative of the reducing condition of exhaust gases. For example, the concentration of HC or CO in exhaust gases may be used. Furthermore, although in the above-described embodiment, the demanded torque PMCMD is used as the load on the engine 3, any other suitable parameter may be used insofar as it is indicative of the load on the engine 3. For example, the accelerator pedal opening AP may be used.

Further, although in the above-described embodiment, the catalyst temperature TLNC is detected by a sensor, this is not limitative, but the catalyst temperature TLNC may be calculated or estimated by computation. For example, the catalyst temperature TLNC may be calculated or estimated based on any of the intake air amount QA, the main injection amount QINJ, the post injection amount QPOST, and the like. Furthermore, the present invention may be applied not only to the diesel engine but also to a gasoline engine, such as a lean burn engine, and various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, comprising:
    a NOx catalyst that is disposed in an exhaust system of the engine, for trapping NOx in exhaust gases;
    exhaust-gas reducing condition-detecting means for detecting a reducing condition of exhaust gases flowing into said NOx catalyst;
    main fuel supply means for supplying main fuel for obtaining an output of the engine;
    auxiliary fuel supply means for supplying auxiliary fuel for regenerating said NOx catalyst;
    first feedback control means for feedback-controlling the detected reducing condition of exhaust gases to a predetermined reducing condition, by controlling only an amount of the main fuel supplied from said main fuel supply means, as a regeneration operation for regenerating said NOx catalyst;
    second feedback control means for feedback-controlling the reducing condition of exhaust gases to the predetermined reducing condition, by feedback-controlling an amount of the auxiliary fuel supplied from said auxiliary fuel supply means and preventing the amount of the main fuel from being feedback-controlled, as the regeneration operation;
    regeneration operation mode-determining means for determining whether or not the regeneration operation should be executed in a catalyst temperature control mode for controlling a temperature of said NOx catalyst; and
    selection means operable when the regeneration operation should be executed in the catalyst temperature control mode as a result of determination by said regeneration operation mode-determining means, to select said first feedback control means, and when the regeneration operation should be executed not in the catalyst temperature control mode, as the result of the determination, to select said second feedback control means.

2. An exhaust emission control device as claimed in claim 1, further comprising load-detecting means for detecting load on the engine,
    wherein when the detected load on the engine is within a predetermined high-load region, said regeneration operation mode-determining means determines that the regeneration operation should be executed in the catalyst temperature control mode.

3. An exhaust emission control device as claimed in claim 1, further comprising SOx-reducing regeneration operation-determining means for determining whether or not the regeneration operation should be executed so as to reduce SOx trapped by said NOx catalyst and cause the NOx catalyst to release the reduced SOx,
    wherein when said SOx-reducing regeneration operation-determining means determines that the regeneration operation should be executed, said regeneration operation mode-determining means determines that the regeneration operation should be executed in the catalyst temperature control mode.

4. An exhaust emission control method for an internal combustion engine including a NOx catalyst that is disposed in an exhaust system of the engine, for trapping NOx in exhaust gases, comprising:
    an exhaust-gas reducing condition-detecting step of detecting a reducing condition of exhaust gases flowing into the NOx catalyst;
    a main fuel supply step of supplying main fuel for obtaining an output of the engine;
    an auxiliary fuel supply step of supplying auxiliary fuel for regenerating the NOx catalyst;
    a first feedback control step of feedback-controlling the detected reducing condition of exhaust gases to a predetermined reducing condition, by controlling only an amount of the main fuel supplied in said main fuel supply step, as a regeneration operation for regenerating the NOx catalyst;
    a second feedback control step of feedback-controlling the reducing condition of exhaust gases to the predetermined reducing condition, by feedback-controlling an amount of the auxiliary fuel supplied in said auxiliary fuel supply step and preventing the amount of the main fuel from being feedback-controlled, as the regeneration operation;

a regeneration operation mode-determining step of determining whether or not the regeneration operation should be executed in a catalyst temperature control mode for controlling a temperature of the NOx catalyst; and a selection step of selecting said first feedback control step when the regeneration operation should be executed in the catalyst temperature control mode as a result of determination in said regeneration operation mode-determining step, and selecting said second feedback control step when the regeneration operation should be executed not in the catalyst temperature control mode, as the result of the determination.

5. An exhaust emission control method as claimed in claim 4, further comprising a load-detecting step of detecting load on the engine, wherein when the detected load on the engine is within a predetermined high-load region, it is determined in said regeneration operation mode-determining step that the regeneration operation should be executed in the catalyst temperature control mode.

6. An exhaust emission control method as claimed in claim 4, further comprising a SOx-reducing regeneration operation-determining step of determining whether or not the regeneration operation should be executed so as to reduce SOx trapped by the NOx catalyst and cause the NOx catalyst to release the reduced SOx, wherein when it is determined in said SOx-reducing regeneration operation-determining step that the regeneration operation should be executed, it is determined in said regeneration operation mode-determining step that the regeneration operation should be executed in the catalyst temperature control mode.

7. An engine control unit including a control program for causing a computer to execute an exhaust emission control method for an internal combustion engine including a NOx catalyst that is disposed in an exhaust system of the engine, for trapping NOx in exhaust gases, wherein the control program causes the computer to detect a reducing condition of exhaust gases flowing into the NOx catalyst, supply main fuel for obtaining an output of the engine, supply auxiliary fuel for regenerating the NOx catalyst, feedback-control the detected reducing condition of exhaust gases to a predetermined reducing condition, by controlling only an amount of the main fuel, as a regeneration operation for regenerating the NOx catalyst, feedback-control the reducing condition of exhaust gases to the predetermined reducing condition, by feedback-controlling an amount of the auxiliary fuel and preventing the amount of the main fuel from being feedback-controlled, as the regeneration operation, determine whether or not the regeneration operation should be executed in a catalyst temperature control mode for controlling a temperature of the NOx catalyst, and select the control of the amount of the main fuel when the regeneration operation should be executed in the catalyst temperature control mode as a result of the determination, and select the control of the amount of the auxiliary fuel when the regeneration operation should be executed not in the catalyst temperature control mode, as the result of the determination.

8. An engine control unit as claimed in claim 7, wherein the control program causes the computer to detect load on the engine, and wherein when the detected load on the engine is within a predetermined high-load region, the control program causes the computer to determine that the regeneration operation should be executed in the catalyst temperature control mode.

9. An engine control unit as claimed in claim 7, wherein the control program causes the computer to determine whether or not the regeneration operation should be executed so as to reduce SOx trapped by the NOx catalyst and cause the NOx catalyst to release the reduced SOx, and wherein when it is determined that the regeneration operation should be executed, as a result of the determination, the control program causes the computer to determine that the regeneration operation should be executed in the catalyst temperature control mode.

* * * * *